United States Patent
Saxton

(10) Patent No.: US 9,366,290 B2
(45) Date of Patent: Jun. 14, 2016

(54) HIGH STRENGTH LOW FRICTION ENGINEERED MATERIAL FOR BEARINGS AND OTHER APPLICATIONS

(71) Applicant: Federal-Mogul Corporation, Southfield, MI (US)

(72) Inventor: David Saxton, Ann Arbor, MI (US)

(73) Assignee: Federal-Mogul Corporation, Southfield, MI (US)

( * ) Notice: Subject to any disclaimer, the term of this patent is extended or adjusted under 35 U.S.C. 154(b) by 77 days.

(21) Appl. No.: 14/085,181

(22) Filed: Nov. 20, 2013

(65) Prior Publication Data

US 2014/0140647 A1   May 22, 2014

Related U.S. Application Data

(60) Provisional application No. 61/815,480, filed on Apr. 24, 2013, provisional application No. 61/728,315, filed on Nov. 20, 2012.

(51) Int. Cl.
*F16C 33/28* (2006.01)
*F16C 33/20* (2006.01)
(Continued)

(52) U.S. Cl.
CPC .............. *F16C 33/04* (2013.01); *F16C 33/1095* (2013.01); *F16C 33/121* (2013.01); *F16C 33/128* (2013.01); *F16C 33/145* (2013.01); *F16C 33/24* (2013.01); *F16C 33/28* (2013.01); *B32B 3/266* (2013.01); *B32B 2307/746* (2013.01); *F16C 2204/52* (2013.01); *Y10T 156/10* (2015.01); *Y10T 428/2462* (2015.01);
(Continued)

(58) Field of Classification Search
None
See application file for complete search history.

(56) References Cited

U.S. PATENT DOCUMENTS

| | | | | |
|---|---|---|---|---|
| 629,395 | A * | 7/1899 | Sargent | F16C 33/28 384/276 |
| 2,198,240 | A * | 4/1940 | Boegehold | 428/554 |

(Continued)

FOREIGN PATENT DOCUMENTS

| | | | | |
|---|---|---|---|---|
| DE | 2357094 | A1 * | 5/1974 | ............ F16C 33/201 |
| DE | 3224751 | A1 * | 2/1984 | .............. F16C 33/20 |

(Continued)

OTHER PUBLICATIONS

Machine Translation of JP 2005163957 A, Jun. 2005.*
(Continued)

*Primary Examiner* — Jeff Vonch
(74) *Attorney, Agent, or Firm* — Robert L. Stearns; Dickinson Wright, PLLC.

(57) ABSTRACT

A high strength, low friction engineered material includes a low friction material filling interstices of a metal microlattice. The metal typically comprises 5 volume % to 25 volume % and the interstices typically comprise 75 volume % to 95 volume %, based on the total volume of the metal microlattice and the interstices. The low friction material preferably fills 100 volume % of the interstices. The metal microlattice can be formed of a single layer, or multiple layers, for example layers of nickel, copper, and tin. The low friction material is typically a polymer, such as polytetrafluoroethylene (PTFE), polyamide (PAI), polyetheretherketone (PEEK), polyethylene (PE), or polyoxymethylene (POM). The low friction material can also include additive particles to modify the material properties. The engineered material can be used in various automotive applications, for example as a bearing, or non-automotive applications.

10 Claims, 4 Drawing Sheets

(51) Int. Cl.
  *F16C 33/24* (2006.01)
  *F16C 33/04* (2006.01)
  *F16C 33/10* (2006.01)
  *F16C 33/12* (2006.01)
  *F16C 33/14* (2006.01)
  *B32B 3/26* (2006.01)

(52) U.S. Cl.
  CPC .. *Y10T 428/24322* (2015.01); *Y10T 428/24331* (2015.01); *Y10T 428/24339* (2015.01); *Y10T 428/24942* (2015.01)

(56) References Cited

U.S. PATENT DOCUMENTS

| | | | | |
|---|---|---|---|---|
| 2,357,106 | A * | 8/1944 | Grenot | F16C 33/14 245/1 |
| 2,498,873 | A * | 2/1950 | Blue | F16C 33/14 164/DIG. 2 |
| 2,517,430 | A * | 8/1950 | Hensel | C23F 1/00 216/103 |
| 2,607,982 | A * | 8/1952 | Hack | F16C 33/28 29/898.054 |
| 2,622,949 | A | 12/1952 | Cotchett | |
| 2,689,380 | A * | 9/1954 | Tait | B29C 43/003 156/309.6 |
| 2,970,933 | A * | 2/1961 | Barera | B22F 7/04 427/433 |
| 3,058,791 | A * | 10/1962 | Stallman | F16C 33/1065 384/284 |
| 3,206,264 | A * | 9/1965 | Van Wyk | F16C 33/06 384/278 |
| 3,608,170 | A * | 9/1971 | Stallman | B22D 19/085 164/100 |
| 3,616,188 | A * | 10/1971 | Mancel | B29C 63/0021 384/300 |
| 3,647,500 | A * | 3/1972 | Mizuno | F16C 33/201 427/195 |
| 3,818,564 | A * | 6/1974 | Tsuya et al. | 29/898.1 |
| 4,000,982 | A * | 1/1977 | Ueda | B22F 3/26 428/545 |
| 4,582,368 | A * | 4/1986 | Fujita | F16C 33/201 384/13 |
| 4,655,944 | A * | 4/1987 | Mori | C08L 27/12 428/545 |
| 4,738,010 | A * | 4/1988 | Ehrfeld | C25D 7/10 29/527.2 |
| 5,217,814 | A * | 6/1993 | Kawakami et al. | 428/545 |
| 5,229,198 | A * | 7/1993 | Schroeder | B32B 27/04 384/300 |
| 5,300,366 | A * | 4/1994 | Nakamaru | C08K 3/04 428/539.5 |
| 5,364,248 | A | 11/1994 | Nakashima et al. | |
| 5,364,682 | A | 11/1994 | Tanaka et al. | |
| 5,861,203 | A * | 1/1999 | Yuan | B29C 43/006 428/117 |
| 6,149,160 | A * | 11/2000 | Stephens | F16C 17/026 277/399 |
| 6,340,534 | B1 * | 1/2002 | Bickle | F16C 33/201 384/908 |
| 6,416,846 | B2 * | 7/2002 | Long | B29C 37/0085 428/209 |
| 6,464,396 | B1 * | 10/2002 | Schubert | F16C 33/14 384/273 |
| 6,465,089 | B2 * | 10/2002 | Niwa | C08K 3/08 428/323 |
| 6,607,820 | B2 * | 8/2003 | Niwa | C08L 27/18 123/188.9 |
| 6,929,733 | B2 * | 8/2005 | Domeier | B29C 33/3857 205/67 |
| 7,939,899 | B1 | 5/2011 | Liu et al. | |
| 8,017,193 | B1 | 9/2011 | Zhou et al. | |
| 8,197,930 | B1 * | 6/2012 | Jacobsen | G02B 6/138 385/129 |
| 8,231,276 | B2 | 7/2012 | Than Trong et al. | |
| 8,663,539 | B1 * | 3/2014 | Kolodziejska | B29C 67/007 264/401 |
| 2005/0260431 | A1 * | 11/2005 | Wolki | F16C 33/28 428/626 |
| 2006/0147332 | A1 * | 7/2006 | Jones | A61F 2/30771 419/8 |
| 2008/0166578 | A1 | 7/2008 | Saxton | |
| 2008/0226870 | A1 * | 9/2008 | Sypeck | B32B 5/26 428/137 |
| 2012/0258293 | A1 * | 10/2012 | Adam | B32B 5/18 428/201 |
| 2013/0196175 | A1 | 8/2013 | Levit | |

FOREIGN PATENT DOCUMENTS

| | | | | |
|---|---|---|---|---|
| DE | 102006030320 | B3 * | 7/2007 | B32B 5/18 |
| DE | 102006007253 | A1 * | 8/2007 | B32B 15/08 |
| DE | 102008025664 | A1 * | 12/2008 | F16C 33/12 |
| EP | 1538354 | A1 * | 6/2005 | F16C 33/12 |
| GB | 1195685 | A * | 6/1970 | F16C 33/04 |
| GB | 1339353 | A * | 3/1977 | F16C 33/20 |
| JP | 53002309 | A * | 1/1978 | |
| JP | 53007781 | A * | 1/1978 | |
| JP | 55106230 | A * | 8/1980 | |
| JP | 58131429 | A * | 8/1983 | |
| JP | 60034516 | A * | 2/1985 | |
| JP | 04004320 | A * | 1/1992 | |
| JP | 06141514 | A * | 5/1994 | |
| JP | 06264110 | A * | 9/1994 | |
| JP | 08041484 | A * | 2/1996 | |
| JP | 10037963 | A * | 2/1998 | |
| JP | 2005163957 | A * | 6/2005 | F16C 33/20 |
| JP | 2009079136 | A | 4/2009 | |
| WO | WO 2011076662 | A1 * | 6/2011 | B32B 5/18 |
| WO | 2013158182 | A2 | 10/2013 | |

OTHER PUBLICATIONS

Queheillalt et al., Cellular metal lattices with hollow trusses, Jan. 2005, Acta Materialia, vol. 53, Issue 2, pp. 303-313.*
Machine Translation of EP 1538354 A1, Jun. 2005.*
Andrews, Open-cell foams with hollow struts: Mechanical property enhancements, Mar. 2006, Materials Letters, vol. 60, Issue 5, pp. 618-620.*
Hodge et al., Synthesis of nickel-aluminide foams by pack-aluminization of nickel foams, Jul. 2001, Intermetallics, vol. 9, Issue 7, pp. 581-589.*
T.A. Schaedler et al: "Ultralight Metallic Microlattices", Science, vol. 334, No. 6058, (Oct. 27, 2011), ISSN: 0036-8075.
International Search Report mailed Apr. 24, 2014 (PCT/US2013/070870).
Interconnected Self-Propagating Photopolymer Waveguides: An Alternative to Stereolithography for Rapid Formation of Lattice-Based Open-Cellular Materials, A. J. Jacobsen*, J. A. Kolodziejska, R. Doty, K. D. Fink, C. Zhou, C. S. Roper, W. B. Carter, HRL Laboratories, LLC, Malibu, CA 90265.
Glycodur® —Excellence in dry bearings!.

* cited by examiner

HIGH STRENGTH LOW FRICTION ENGINEERED MATERIAL FOR BEARINGS AND OTHER APPLICATIONS

CROSS REFERENCE TO RELATED APPLICATION

This application claims the benefit of U.S. provisional patent application Ser. No. 61/728,315, filed Nov. 20, 2012, and U.S. provisional patent application Ser. No. 61/815,480, filed Apr. 24, 2013, the entire contents of which are hereby incorporated by reference in their entirety.

BACKGROUND OF THE INVENTION

1. Field of the Invention

The invention relatives generally to engineered materials, and more particularly to high strength, low friction materials, and methods of forming the same.

2. Related Art

Polymer materials are useful in many applications where two surfaces meet and need to match, such as bearings, gaskets, seals, wipers, and similar applications. Polymer materials provide good conformability, despite any wear, defects, or unplanned conditions, and also provide low friction, which permits the two surfaces to slide against one another with low forces and very little heat. Another advantage provided by polymer materials is corrosion resistance. However, the strength of polymer materials is relatively low compared to metals, so the use of plastic materials is limited in applications where applied loads become excessive, such as in automotive bearings.

SUMMARY OF THE INVENTION

One aspect of the invention provides an engineered material comprising a microlattice formed of metal, and a low friction material disposed in the interstices of the metal microlattice. The low friction material has a coefficient of friction less than a coefficient of friction of the metal microlattice.

Another aspect of the invention provides a method of forming the engineered material. The method includes forming the microlattice of metal, and disposing the low friction material in the interstices of the metal microlattice.

The engineered material provides advantages of both metal and plastic simultaneously. The metal microlattice provides strength sufficient to withstand applied loads while requiring a relative low amount of metal, compared to conventional products used for the same application. Thus, the engineered material is more economical to manufacture compared to the conventional products. At the same time, the low friction material provides conformability and low friction. When the low friction material comprises a polymer, it also provides corrosion resistance and permits sliding against another surface with low force and low heat.

Another aspect of the invention provides a bearing formed of the engineered material, and a method of forming the bearing comprising the engineered material. The engineered material can be attached or bonded to another solid structure, for example a bronze or steel backing of the bearing. However, the engineered material is also strong enough to stand on its own. Thus, a bearing formed of the engineered material is capable of supporting applied loads with less metal and thus lower costs, compared to conventional bearings. In addition, the high amount of low friction material performs well in high speed and stop-start applications, eliminates the need for a 100% polymer coating, and also allows the bearing to be machined without loss of performance.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE ENABLING EMBODIMENT

Figure 1:
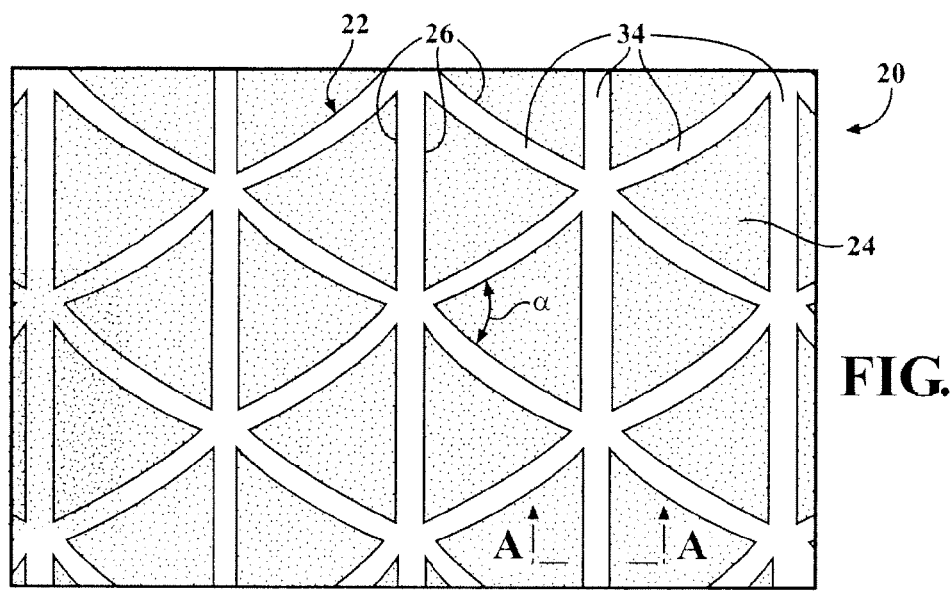
FIG. 1 is a magnified view of an engineered material including a metal microlattice and low friction material according to an exemplary embodiment of the invention.

Referring to the Figures, wherein like numerals indicate corresponding parts throughout the several views, an engineered material 20 providing high strength and low friction is generally shown in FIG. 1. The engineered material 20 can be used in a variety of applications requiring high strength and/or low friction, including automotive and non-automotive applications. The engineered material 20 includes a metal microlattice 22 providing strength to withstand applied loads, and a low friction material 24 disposed in interstices 26 of the metal microlattice 22 to provide conformability, low friction, and corrosion resistance.

Figure 2:
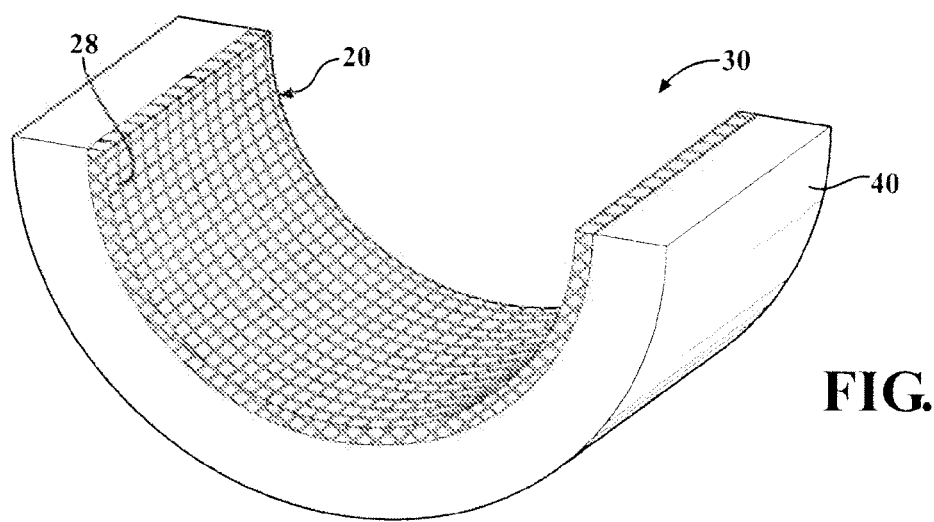
FIG. 2 is a bearing including the engineered material according to an exemplary embodiment of the invention.

The metal microlattice 22 is formed of metal; which can be any type of metal or metal alloy providing strength sufficient to withstand the loads encountered in the application for which the engineered material 20 is designed. In one exemplary embodiment, the engineered material 20 is designed to provide a sliding surface 28 of an automotive bearing 30, as shown in FIG. 2, and the metal microlattice 22 is formed of nickel or a nickel alloy. The metal microlattice 22 can be designed with high percentages of metal at the more highly loaded locations compared to the lightly loaded locations. The metal microlattice 22 can include one layer 32 of metal, or a plurality of layers 32 of metal, for example layers 32 of nickel, copper, and tin. The layers 32 can have the same composition as one another or different compositions. In one embodiment, when the layers 32 have different metal compositions, the metal layers 32 are alloyed together, for example by a heat treatment process.

As shown in FIG. 1, the metal microlattice 22 of the engineered material 20 comprises a plurality of struts 34 interconnected to one another and presenting a plurality of interstices 26. The metal microlattice 22 is typically present in an amount of approximately 5 to 25 volume % and the interstices 26 are present in an amount of approximately 75 to 95 volume %, based on the total volume of the metal microlattice 22 and the interstices 26. In the exemplary embodiment, the metal microlattice 22 is present in an amount of 85 volume % and the interstices 26 are present in an amount of 15 volume %, based on the total volume of the metal microlattice 22 and the interstices 26. Prior to applying the low friction material 24, the interstices 26 are filled with air and thus the metal microlattice 22 is very light in weight and behaves similar to an elastomer. For example, when compressed, the metal microlattice 22 almost completely recovers to its original shape.

Figure 1A:
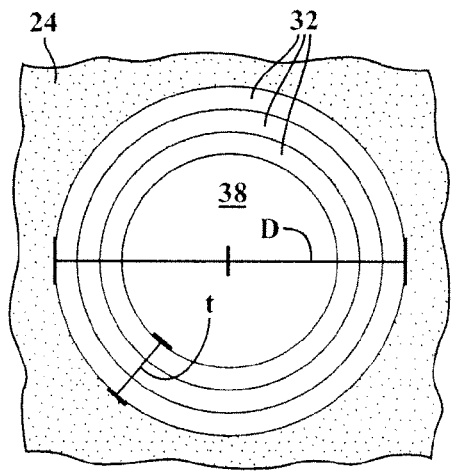
FIG. 1A is an enlarged cross-sectional view of a portion of the engineered material of FIG. 1.

Each strut 34 of the metal microlattice 22 is typically disposed at an angle α of 50° to 90° relative to horizontal and has a diameter D in the micrometer range. In the exemplary embodiment, the diameter D of each strut 34 is about 50 micrometers. As shown in FIG. 1A, each of the struts 34 comprises a wall surrounding a center axis and presents an opening 38, which may be hollow or alternatively filled with a template polymer. The wall thickness t surrounding the hollow opening 38 can be any thickness t in the micrometer range, for example 5 to 20 micrometers. In the exemplary embodiment, the wall thickness t is about 15 micrometers. The metal microlattice 22 can comprise a two dimensional or three dimensional structure. In one embodiment, the metal microlattice 22 comprises a three dimensional structure and presents a total thickness of about 100 μm to 5 cm.

The low friction material 24 preferably fills 100 volume % of the interstices 26. The low friction material 24 has a coefficient of friction less than the coefficient of friction of the metal microlattice 22 and can comprise a variety of different materials. In the exemplary embodiment, the low friction material 24 is a polymer-based material including at least one of polytetrafluoroethylene (PTFE), polyamideimide (PAI), polyetheretherketone (PEEK), polyethylene (PE), and polyoxymethylene (POM). The low friction material 24 can alternatively be formed of tin, lead, bismuth, or alloys thereof. In one embodiment, the low friction material 24 includes particles selected from the group consisting of ceramic, such as oxides, nitrides, phosphides, and carbides; graphite; boron nitride; molybdenum disulfide; copper; and silver. For example, hard particles can be added for wear resistance, lubricating particles can be added to further reduce friction. The particles can also include antimicrobial additives, such as Cu and/or Ag. Examples of commercially available low friction materials 24 include GLYCODUR®, G-92, and IROX®.

The engineered material 20 includes the metal microlattice 22 in an amount of 0.5 volume % to 90 volume % and the low friction material 24 in an amount of 10 volume % to 99.5 volume %, based on the combined total volume of the metal microlattice 22 and the low friction material 24. However, the amount of low friction material 24 relative to the metal microlattice 22 can vary depending on the application and performance desired. In the exemplary embodiment, the engineered material 20 includes the metal microlattice 22 in an amount of 10 volume % to 50 volume %, and the low friction material 24 in an amount of 50 volume % to 90 volume %, based on the total volume of the metal microlattice 22 and low friction material 24.

The engineered material 20 provides the advantages of both metal and plastic simultaneously. The metal microlattice 22 provides strength sufficient to withstand applied loads while requiring a relatively low amount of metal, compared to conventional products used for the same application. Thus, the engineered material 20 is more economical to manufacture compared to comparative conventional products. At the same time, the low friction material 24 provides conformability and low friction. When the low friction material 24 comprises a polymer, it also provides corrosion resistance and permits sliding against another surface with low force and low heat.

A wide variety of desired properties can be achieved by adjusting the composition of the metal and low friction material 24, as well as the design of the metal microlattice 22. Furthermore, the engineered material 20 can be attached or bonded to another solid structure, for example a bronze or steel backing 40 of the bearing 30. However, the engineered material 20 is typically strong enough to stand on its own. The engineered material 20 is especially good for bearing applications, as the metal microlattice 22 supports the applied loads with less metal and thus lower costs, compared to conventional bearings. In addition, the high amount of low friction material 24 performs well in high speed and stop-start applications, eliminates the need for a 100% polymer coating, and also allows the bearing 30 to be machined without loss of performance.

Figure 3:
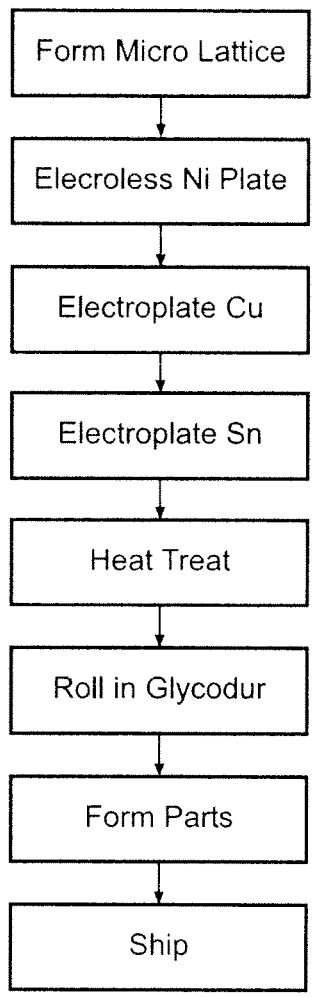
FIG. 3 illustrates a method of forming the engineered material according to an exemplary embodiment.

Another aspect of the invention provides a method of forming the engineered material 20 by forming the microlattice of metal, and disposing the low friction material 24 in the interstices 26 of the metal microlattice 22. FIG. 3 illustrates the method steps according to one exemplary embodiment.

Figure 4:
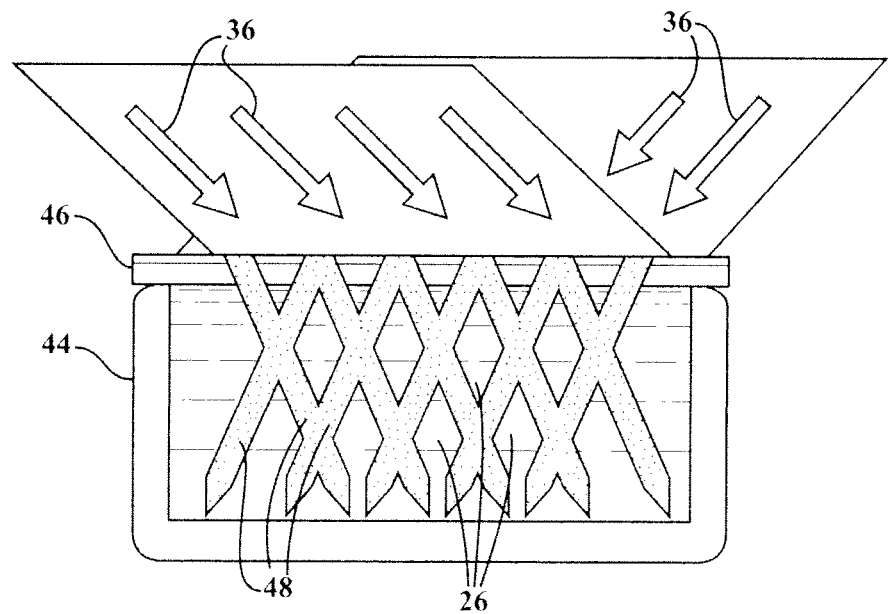
FIG. 4 illustrates the step of forming a template polymer microlattice.

The method of forming the engineered material 20 first includes preparing a template polymer microlattice 42 having a predetermined structure that will provide the structure of the finished metal microlattice 22. The template polymer microlattice 42 is preferably formed from a ultra-violet (UV) curable resin, also referred to as a negative resist photomonomer. In the exemplary embodiment, as shown in FIG. 4, a reservoir 44 of the UV curable resin in liquid form is provided, and a perforated mask 46 is disposed over the reservoir 44. The method next includes passing multiple beams of UV light 36 through the perforated mask 46 and into the reservoir 44. The UV light 36 travels along predetermined paths, which depend on the desired structure of the template polymer microlattice 42 to be formed. The UV light 36 then transforms the liquid UV curable resin from UV-opaque to UV-transparent, and also from a liquid monomer to a solid polymer along the predetermined paths. The UV light beams 36 are able to penetrate deeper into the reservoir 44 along the solid polymer. The remaining liquid monomer beneath and in-line with the light beam 36 then transforms to solid polymer, thus self-propagating waveguide formation. By aligning the UV light beams 36 at different intersecting angles, a plurality of interconnected solid polymer fibers 48 are formed, which together form the template polymer microlattice 42. The step of preparing the template polymer microlattice 42 is a continuous process which can occur at a rate greater than 1 mm² per minute.

Figure 5:
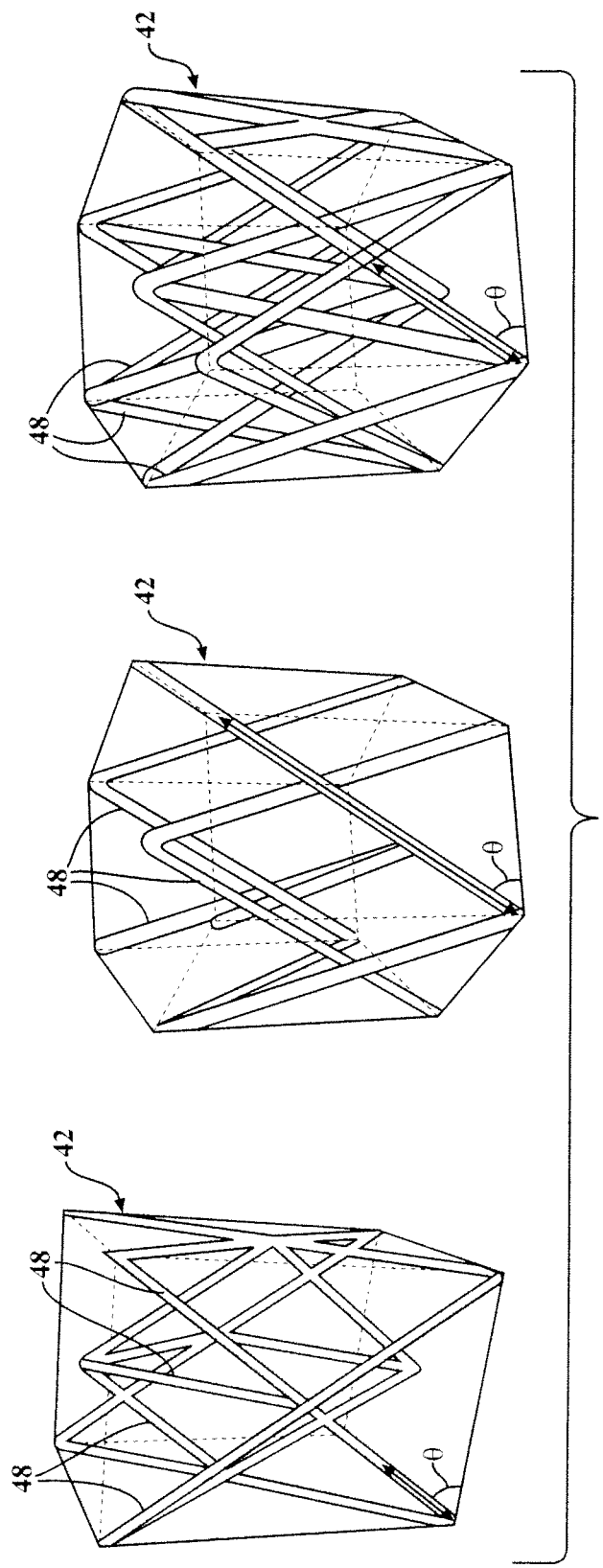
FIG. 5 shows three exemplary template polymer microlattices formed by the step of FIG. 4.
Figure 6:
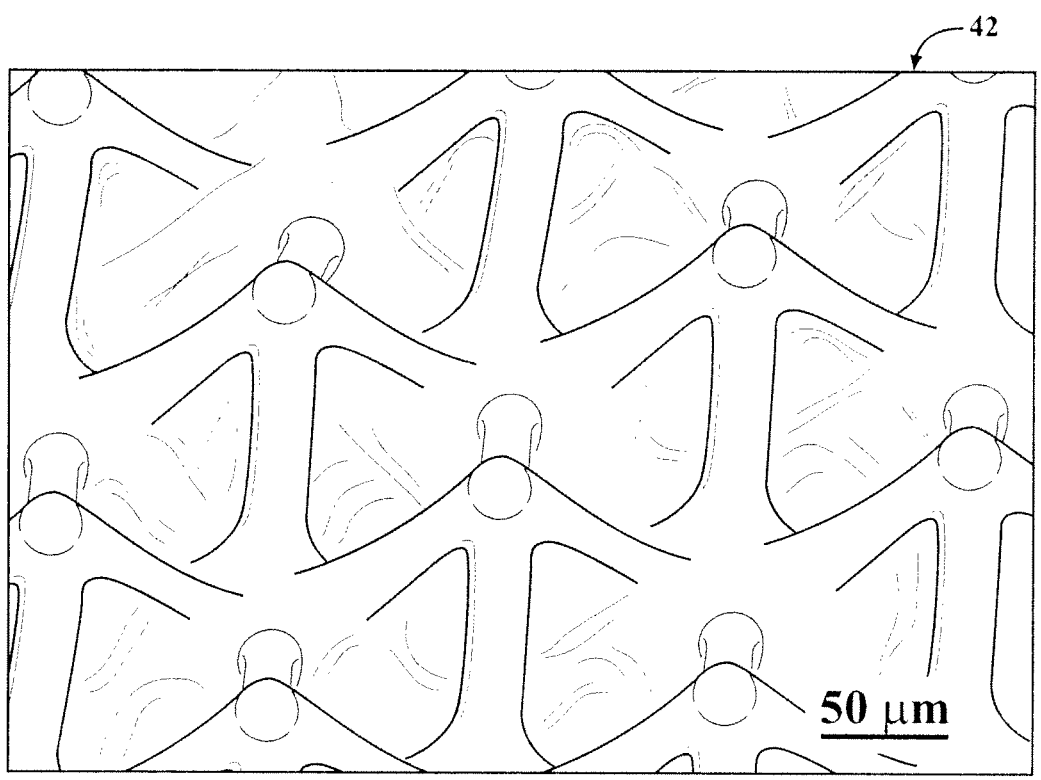
FIG. 6 is a magnified view of a template polymer microlattice formed by the step of FIG. 4.

FIG. 5 illustrates example designs of the template polymer microlattice 42 formed by the exemplary method, and FIG. 6 is a magnified view of a three dimensional template polymer microlattice 42 according to one exemplary embodiment. Typically, the solid polymer fibers 48 of the template polymer microlattice 42 each extend at an angle α of 50° to 90° relative to horizontal. The solid polymer fibers 48 are also spaced from one another and thus provide a plurality of interstices 26 therebetween. The template polymer microlattice 42 can comprise two or three dimensions, depending on the desired application or performance required. The template polymer microlattice 42 can also be formed or bent into various different shapes, depending on the application and performance desired.

The method next includes coating the template polymer microlattice 42 with the metal to form the metal microlattice 22. As discussed above, any type of metal or metal alloy can be used to form the metal microlattice 22. In the exemplary embodiment, the engineered material 20 is designed to provide the sliding surface 28 of the automotive bearing 30, as shown in FIG. 2, and thus is formed of nickel or a nickel alloy. The step of coating the template polymer microlattice 42 can include plating or electrodepositing the metal onto the template polymer microlattice 42, or alternatively can comprise an electroless process. The coating step includes forming a plurality of the metal struts 34 surrounding the solid polymer fibers 48. The metal struts 34 are interconnected to one another and present the plurality of interstices 26 therebetween. Thus, the interconnected struts 34 form the metal microlattice 22 having a design matching the design of the template polymer microlattice 42. In one embodiment, the method includes forming a design with additional struts 34 or more closely spaced struts 34 in one area of the template polymer microlattice 42 relative to the other areas of the template polymer microlattice 42, and thus applying a greater amount of the metal to one area of the template polymer microlattice 42 relative to other areas of the template polymer microlattice 42. According to another embodiment, the method includes applying multiple layers 32 of the metal to the template polymer microlattice 42. For example, the method of FIG. 3 includes electroless plating a layer 32 of nickel, followed by electroplating a layer 32 of copper and then a layer 32 of tin, as shown in FIG. 1A.

Figure 7:
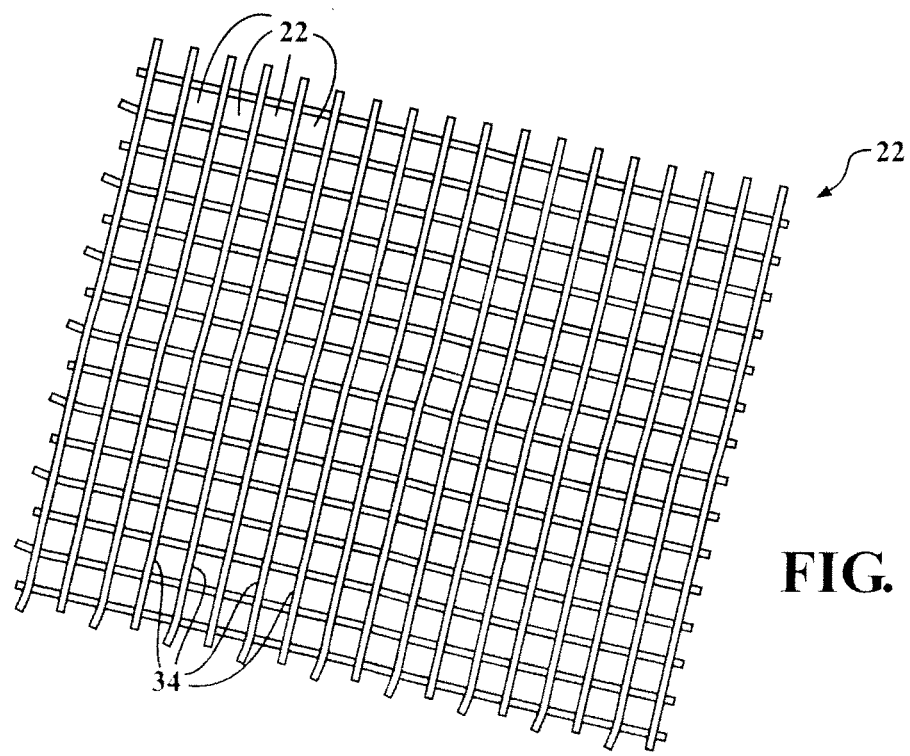
FIG. 7 illustrates the metal microlattice prior to applying the low friction material according to an exemplary embodiment.

The method optionally includes removing the template polymer microlattice 42 from the metal microlattice 22 by heating the template polymer microlattice 42. Various different methods can be used to remove the template polymer microlattice 42. For example, after coating the metal microlattice 22, the two microlattices 22, 42 can be heat treated to melt the template polymer microlattice 42. The template polymer microlattice 42 is then removed so that only the metal microlattice 22 remains. When the metal microlattice 22 includes multiple layers 32 of different metals, the heating step used to remove the template polymer microlattice 42 can simultaneously alloy the different metal layers 32 together. Alternatively, the step of alloying the different metal layers 32 together can be conducted after removing the template polymer microlattice 42. FIG. 7 illustrates the metal microlattice 22 after the template polymer microlattice 42 has been removed, according to one exemplary embodiment. In another embodiment, at least a portion of the template polymer microlattice 42 remains in the openings of the metal struts 34 and thus in the finished engineered material 20.

Prior to applying the low friction material 24 to the metal microlattice 22, the method can include attaching the metal microlattice 22 to another structure. For example, the method can include attaching the engineered material 20 to the backing 40 to form the bearing 30 of FIG. 2. Alternatively, the metal microlattice 22 can be used on its own.

The method next includes applying the low friction material 24 to the metal microlattice 22 and disposing the low friction material 24 in the interstices 26 of the metal microlattice 22 to form the engineered material 20. The metal microlattice 22 acts as a skeleton, providing support and strength, while the low friction material 24 provides a conforming, low friction surface. The step of applying the low friction material 24 can include rolling the low friction material 24 onto the metal microlattice 22, or infiltrating the low friction material 24 into the interstices 26 of the metal microlattice 22. The low friction material 24 is preferably applied so that it fills 100 volume % of the total volume of the interstices 26.

After applying the template polymer microlattice 42, the method can include machining the engineered material 20 to the desired dimensions. The method can also include applying the engineered material 20 to another component, such as the backing 40 of the bearing 30. If the low friction material 24 includes a polymer, then method can include sintering the engineered material 20 to promote cross-linking of the polymer. Typically, due to the high amount of low friction material 24, no additional polymer coating is required, such as when the engineered material 20 is used as the sliding surface 28 of the bearing 30.

The finished engineered material 20 can be used in various automotive applications in addition to bearings, such as gaskets, seals, and wipers. Alternatively, the engineered material 20 can be used in non-automotive applications requiring high strength and low friction.

Obviously, many modifications and variations of the present invention are possible in light of the above teachings and may be practiced otherwise than as specifically described while within the scope of the appended claims.

What is claimed is:
1. An engineered material, comprising:
a microlattice formed of metal, said metal microlattice presenting a plurality of interstices;
a low friction material disposed in said interstices of said metal microlattice;
said low friction material having a coefficient of friction less than a coefficient of friction of said metal microlattice; and
wherein said metal microlattice is present in an amount of approximately 15 volume % and said interstices are present in an amount of approximately 85 volume %, based on the total volume of said metal microlattice and said interstices;
said metal microlattice is formed of nickel;
said metal microlattice comprises a plurality of struts interconnected to one another and presenting said interstices;
each of said struts includes a hollow opening;
each of said struts is disposed at an angle of 50° to 90° relative to horizontal, has a diameter of about 50 micrometers, and a wall thickness of about 15 micrometers surrounding said hollow opening;
said low friction material filling said interstices;
said low friction material including at least one of polytetrafluoroethylene (PTFE), polyamide (PAI), polyetheretherketone (PEEK), polyethylene (PE), polyoxymethylene (POM), tin, and bismuth; and
said low friction material including particles selected from the group consisting of ceramic, graphite molybdenum disulfide, copper, and silver.

2. The engineered material of claim 1, wherein said low friction material includes polyamide (PAI).

3. The engineered material of claim 2, wherein said added particles include at least one of graphite and molybdenum disulfide.

4. The engineered material of claim 1, wherein said low friction material includes a cross-linked polymer.

5. The engineered material of claim 1, wherein said metal microlattice includes a plurality of different metal layers alloyed together.

6. The engineered material of claim 1, wherein said metal microlattice presents a thickness of about 100 μm to 5 cm.

7. A bearing, comprising:
an engineered material including a microlattice formed of metal, said metal microlattice including a plurality of struts interconnected to one another and forming a three-dimensional structure;
each of said struts of said metal microlattice including a wall surrounding an opening;
said struts of said metal microlattice presenting a plurality of interstices;

said interstices being present in an amount of 75 to 95 volume percent (%), based on the total volume of said metal microlattice;

said engineered material further including a low friction material disposed in said interstices of said metal microlattice, said low friction material having a coefficient of friction less than the coefficient of friction of said metal microlattice, and wherein said metal microlattice is present in an amount of approximately 15 volume % and said interstices are present in an amount of approximately 85 volume %, based on the total volume of said metal microlattice and said interstices;

said metal microlattice is formed of nickel;

each of said struts is disposed at an angle of 50° to 90° relative to horizontal, has a diameter of about 50 micrometers, and a wall thickness of about 15 micrometers surrounding said opening;

said low friction material fills said interstices;

said low friction material includes at least one of polytetrafluoroethylene (PTFE), polyamide (PAI), polyetheretherketone (PEEK), polyethylene (PE), polyoxymethylene (POM), tin, and bismuth; and said low friction material includes particles selected from the group consisting of ceramic, graphite molybdenum disulfide, copper, and silver.

8. The bearing of claim 7 including a backing attached to said engineered material, and wherein said engineered material presents a sliding surface without a coating of polymer material applied to said engineered material.

9. The bearing of claim 7, wherein one area of said metal microlattice includes a greater amount of said metal relative to other areas of said metal microlattice.

10. The bearing of claim 7, wherein said metal microlattice presents a thickness of about 100 µm to 5 cm.

* * * * *